United States Patent
Taguchi

(10) Patent No.: US 8,352,124 B2
(45) Date of Patent: Jan. 8, 2013

(54) STEERING CONTROL DEVICE

(75) Inventor: Koji Taguchi, Isehara (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 458 days.

(21) Appl. No.: 12/674,029

(22) PCT Filed: Aug. 25, 2008

(86) PCT No.: PCT/JP2008/065113
§ 371 (c)(1),
(2), (4) Date: Feb. 18, 2010

(87) PCT Pub. No.: WO2009/028461
PCT Pub. Date: Mar. 5, 2009

(65) Prior Publication Data
US 2011/0040446 A1    Feb. 17, 2011

(30) Foreign Application Priority Data
Aug. 27, 2007  (JP) ................................ 2007-220008

(51) Int. Cl.
*B62D 6/00*   (2006.01)
(52) U.S. Cl. ......................................... 701/41; 180/443
(58) Field of Classification Search .................... 701/41, 701/42; 180/443
See application file for complete search history.

(56) References Cited

FOREIGN PATENT DOCUMENTS

| DE | 10 2005 033 866 A1 | 1/2007 |
|----|---|---|
| JP | A-6-72340 | 3/1994 |
| JP | A-11-91604 | 4/1999 |
| JP | A-11-321690 | 11/1999 |
| JP | A-2002-12159 | 1/2002 |
| JP | A-2002-120744 | 4/2002 |
| JP | A-2004-196100 | 7/2004 |
| JP | A-2005-225430 | 8/2005 |
| JP | A-2006-111184 | 4/2006 |
| JP | A-2006-159995 | 6/2006 |
| JP | A-2007-38750 | 2/2007 |

OTHER PUBLICATIONS

International Search Report issued in International Application No. PCT/JP2008/065113 on Nov. 4, 2008.
International Preliminary Report on Patentability issued in International Application No. PCT/JP2008/065113 on Mar. 18, 2010 (with English translation).
Extended European Search Report issued in European Application No. 08828280.1 dated Apr. 29, 2011.

*Primary Examiner* — Patrick Cicchino
(74) *Attorney, Agent, or Firm* — Oliff & Berridge, PLC

(57) ABSTRACT

A steering control device for a vehicle includes a steering characteristic setting unit setting the range of a steering manipulation angle corresponding to a tire angle in a predetermined range (near an induction target tire angle for guiding to a target locus), which is determined on the basis of the target locus upon vehicle traveling, to be wider than the range of a steering manipulation angle corresponding to a tire angle outside of the predetermined range. A reduction gear ratio of a steering mechanism in the predetermined range increases.

6 Claims, 3 Drawing Sheets

STEERING CONTROL DEVICE

TECHNICAL FIELD

The present invention relates to a steering control device.

BACKGROUND ART

In recent years, to reduce a burden imposed on a driver, a device is developed which provides various kinds of driving assistance to the driver. For example, a lane keeping device is known in which a pair of white lines are detected from an image obtained by capturing the vehicle's front side, and steering assist torque is provided to a steering mechanism such that the vehicle travels along the center (target locus) of the lane constituting the pair of white lines (see Patent Citation 1). In this lane keeping device, upon steering control, feedback control is performed, how much the actual position of the vehicle is shifted from the target locus (that is, an error) is detected, the steering assist torque is calculated so as to reduce the error, and the steering assist torque is generated.

[Patent Citation 1] Japanese Unexamined Patent Application Publication No. 11-321690
[Patent Citation 2] Japanese Unexamined Patent Application Publication No. 2007-38750
[Patent Citation 3] Japanese Unexamined Patent Application Publication No. 2002-12159
[Patent Citation 4] Japanese Unexamined Patent Application Publication No. 2002-120744
[Patent Citation 5] Japanese Unexamined Patent Application Publication No. 2005-225430

DISCLOSURE OF INVENTION

Technical Problem

During lane keeping, the driver may want to travel away from the target locus in accordance with the traveling conditions. For example, when a heavy vehicle is present near own vehicle, the driver wants to travel away from the heavy vehicle and may manipulate the steering wheel so as to travel slightly off the center of the lane toward the opposite side to the heavy vehicle. In addition, when an obstacle, such as a fallen object, is present in front of the own vehicle, the driver manipulates the steering wheel so as to avoid the obstacle. If such a steering wheel manipulation is performed during lane keeping, the steering wheel manipulation of the driver is disturbed by the steering assist torque (counter torque) which allows the vehicle to travel along the center of the lane, so the driver should input large manual torque so as to change a tire angle to an intended tire angle. As described above, when control is performed such that the vehicle is guided to the target locus using the steering assist torque, it is difficult to reflect a steering wheel manipulation away from the target locus by the driver.

Accordingly, it is an object of the invention to provide a steering control device capable of guiding to a target locus without depending on steering torque assist.

Technical Solution

The invention provides a steering control device for a vehicle. The steering control device includes a steering characteristic setting unit setting the range of a steering manipulation angle corresponding to a tire angle in a predetermined range to be wider than the range of a steering manipulation angle corresponding to a tire angle outside of the predetermined range.

With this steering control device, the steering characteristic setting unit sets the range of a steering manipulation angle corresponding to a tire angle in a predetermined range to be wider than the range of a steering manipulation angle corresponding to a tire angle outside of the predetermined range, so when the tire angle is in the predetermined range, the tire angle is unlikely to be changed with respect to the steering manipulation angle by the driver. That is, in a region of a tire angle in a predetermined range, a reduction gear ratio in a steering mechanism increases, and the change amount of the tire angle decreases with respect to the change amount of the steering manipulation angle. The tire angle in the predetermined range is the range of a target tire angle, for example, the range of a tire angle necessary for guiding to a target locus. Therefore, with this steering control device, traveling at the target tire angle can be easily performed without depending on the steering assist torque, and the guidance to the target locus can be achieved. To the contrary, in a region of a tire angle outside of the predetermined range, the reduction gear ratio of the tire angle with respect to the steering manipulation angle decreases in comparison with the region of the tire angle in the predetermined range, and the change amount of the tire angle increases with respect to the change amount of the steering manipulation angle. Therefore, with this steering control device, if the tire angle is adjusted to a tire angle outside of the predetermined range by a manual operation of the driver, the tire angle is easily changed in accordance with the manual operation by the driver, and an intended steering operation of the driver is easily accomplished.

In the steering control device of the invention, the tire angle in the predetermined range may be determined by a target locus upon vehicle traveling. With this steering control device, the tire angle in the predetermined range becomes a tire angle necessary for guiding to the target locus, so the guidance to the target locus can be achieved without depending on steering assist torque, and traveling near the target locus can be easily performed.

The steering control device of the invention may further include a basic map defining a relationship between a steering manipulation angle and a tire angle with respect to the steering manipulation angle. The steering characteristic setting unit may set the range of a steering manipulation angle corresponding to a tire angle for attaining a target locus to be wider than the basic map.

With this steering control device, a basic map representing a general relationship between a steering manipulation angle and a tire angle (that is, a basic map representing a general reduction gear ratio in a steering mechanism) is prepared, and the steering characteristic setting unit sets the range of a steering manipulation angle corresponding to a tire angle for attaining the target locus to be wider than the basic map, so in a region of a tire angle for attaining the target locus, the tire angle is difficult to change with respect to the steering manipulation angle. Therefore, traveling at the tire angle for guiding to the target locus can be easily performed, and the guidance to the target locus can be achieved.

The steering control device of the invention may further include a steering reduction gear ratio adjustment mechanism changing a reduction gear ratio in a steering mechanism. The steering characteristic setting unit may set a reduction gear ratio by the steering reduction gear ratio larger as the tire angle approaches a target tire angle.

This steering control device includes the steering reduction gear ratio adjustment mechanism, such that the relationship between the steering manipulation angle and the steering wheel angle can be arbitrarily controlled by the steering reduction gear ratio adjustment mechanism. Thus, in the steering control device, to widen the range of the steering manipulation angle corresponding to the tire angle as the tire angle approaches the target tire angle, the steering characteristic setting unit increases the reduction gear ratio in the steering mechanism as the tire angle approaches the target tire angle by the steering reduction gear ratio adjustment mechanism.

Advantageous Effects

According to the invention, the reduction gear ratio in the steering mechanism is adjusted, such that the guidance to the target locus can be achieved without depending on the steering assist torque.

EXPLANATION OF REFERENCES

1: STEERING CONTROL DEVICE
10: STEERING ANGLE SENSOR
11: TIRE ANGLE SENSOR
12: WHEEL SPEED SENSOR
13: WHITE LINE DETECTION SENSOR
20: STEERING ACTUATOR
21: GEAR RATIO ADJUSTMENT ACTUATOR
30: ECU

BEST MODE FOR CARRYING OUT THE INVENTION

Hereinafter, an embodiment of a steering control device according to the invention will be described with reference to the drawings.

In this embodiment, a steering control device according to the invention is applied to a steering control device having an electrically assisted power steering function and a steering gear ratio adjustment function. In the steering control device according to this embodiment, with respect to a steering wheel manipulation by a driver, steering assist torque is provided to a steering mechanism so as to reduce a steering wheel manipulation of the driver, and a gear ratio (reduction gear ratio) in the steering mechanism changes so as to easily perform traveling on a target locus without depending on the steering assist torque.

Figure 1:
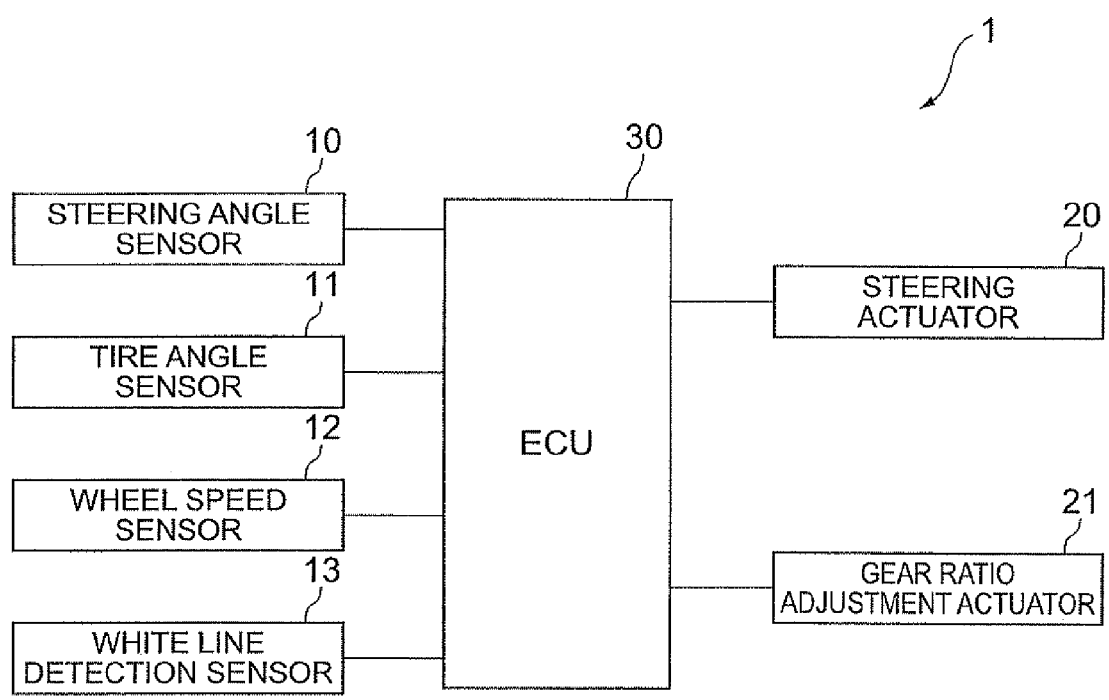
FIG. 1 is a configuration diagram of a steering control device according to this embodiment.
Figure 2:
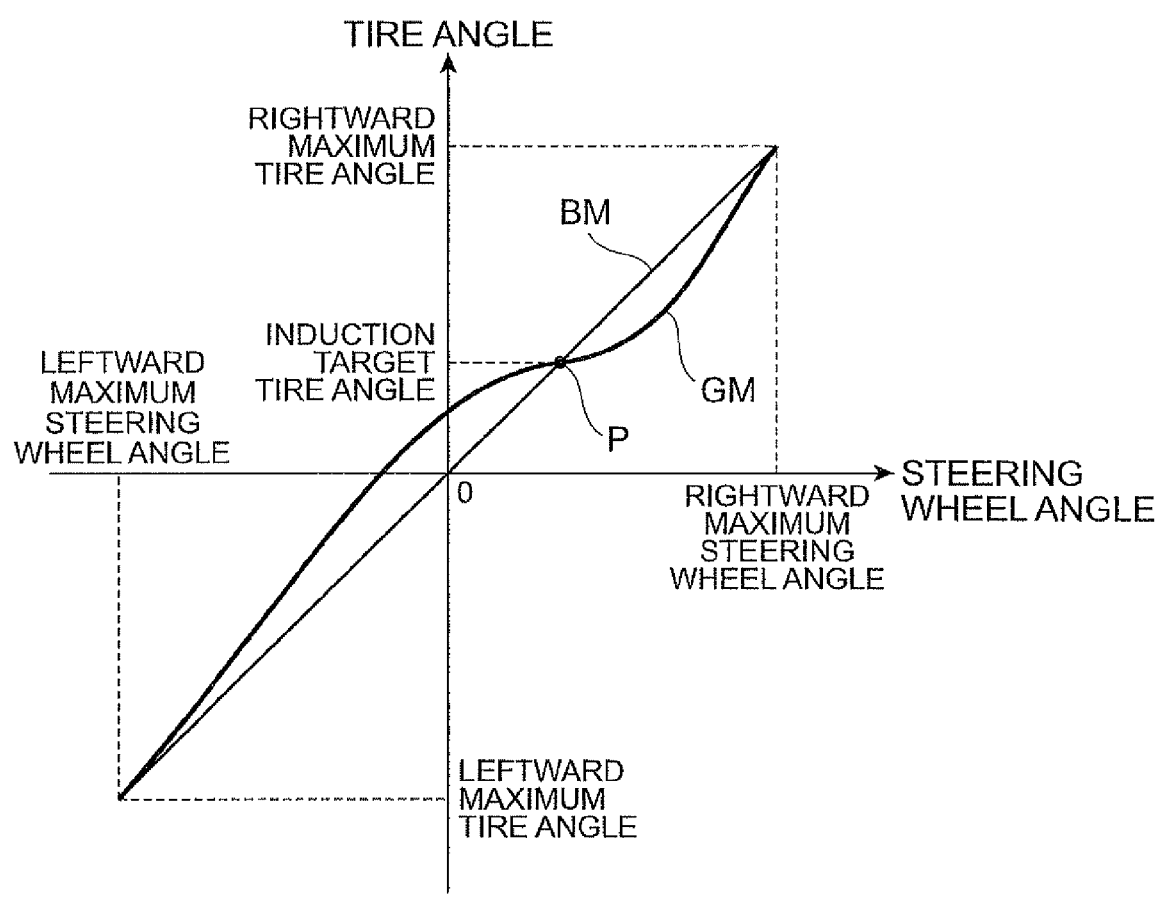
FIG. 2 shows an example of a steering wheel angle-tire angle correspondence map.

A steering control device 1 according to this embodiment will be described with reference to FIGS. 1 and 2. FIG. 1 is a configuration diagram of a steering control device according to this embodiment. FIG. 2 shows an example of a steering wheel angle-tire angle correspondence map.

The steering control device 1 performs electrically assisted power steering control so as to provide steering assist torque to the steering mechanism, and performs steering gear ratio variable control so as to change the gear ratio in the steering mechanism. In particular, in the case of steering gear ratio variable control, the gear ratio (reduction gear ratio) in the steering mechanism increases near an induction target tire angle for guiding to the target locus and decreases in other regions such that induction traveling to the target locus and traveling desired by the driver (traveling out of the target locus) are compatibly performed. To this end, the steering control device 1 includes a steering angle sensor 10, a tire angle sensor 11, a wheel speed sensor 12, a white line detection sensor 13, a steering actuator 20, a gear ratio adjustment actuator 21, and an ECU [Electronic Control Unit] 30. In this embodiment, processing in the ECU 30 corresponds to a steering characteristic setting unit described in the appended claims.

The steering angle sensor 10 is a sensor which detects a steering angle (steering wheel angle) input from the steering by the driver. The steering angle sensor 10 detects a steering angle and transmits the steering angle to the ECU 30 as a steering angle signal.

The tire angle sensor 11 is a sensor which detects a tire angle of turned wheels of a vehicle. The tire angle sensor 11 detects a tire angle and transmits the tire angle to the ECU 30 as a tire angle signal.

The wheel speed sensor 12 is a sensor which is provided for each of four wheels of the vehicle to detect the rotation speed of the wheel (the number of pulses according to rotation of the wheel). The wheel speed sensor 12 detects a wheel rotation pulse number for every predetermined time and transmits the detected rotation pulse number to the ECU 30 as a wheel speed signal. The ECU 30 calculates a wheel speed from the rotation speed of each wheel and calculates a vehicle body speed (vehicle speed) from the wheel speed of each wheel.

The white line detection sensor 13 is a sensor which includes a camera and an image processor and detects a pair of white lines (lane). The white line detection sensor 13 captures an image of a road on the front side of own vehicle by the camera. Then, the white line detection sensor 13 recognizes a pair of white lines representing a lane, on which the vehicle is traveling, from the captured image by the image processor. A lane width, a line passing through the center of the pair of white lines (that is, the center line of the lane), and the radius of the center of the lane (curve radius R) are calculated from the recognized pair of white lines, and curve curvature $\gamma(=1/R)$ is calculated from the curve radius R. In addition, the orientation of the vehicle with respect to the white lanes (yaw angle) and the position (offset) of the center of the vehicle with respect to the center of the lane are calculated. The white line detection sensor 13 transmits information regarding the recognized pair of white lines or calculated information to the ECU 30 as a white line detection signal.

The steering actuator 20 is an actuator which transfers a rotation drive force by a motor to the steering mechanism (rack, pinion, column, and the like) through a reduction gear and provides steering assist torque to the steering mechanism. In the steering actuator 20, if a steering control signal is received from the ECU 30, the motor is driven to rotate in response to the steering control signal, such that the steering assist torque is generated.

The gear ratio adjustment actuator 21 is an actuator which can arbitrarily control an angle difference between a steering wheel angle and a tire angle (the degree of change of a tire angle with respect to a steering wheel angle), and arbitrarily changes the tire angle of turned wheels. Thus, the reduction gear ratio of a tire angle with respect to a steering wheel angle (the gear ratio in the steering mechanism) arbitrarily changes. When receiving a gear ratio variable control signal from the ECU 30, the gear ratio adjustment actuator 21 changes the tire angle in accordance with the gear ratio variable control signal.

The ECU 30 is an electronic control unit which includes a CPU [Central Processing Unit], a ROM [Read Only Memory], a RAM [Random Access Memory], and the like, and performs overall control of the steering control device 1. The ECU 30 receives signals from the sensors 10 to 13 for every predetermined time. The ECU 30 performs electrically assisted power steering control and transmits the steering control signal to the steering actuator 20. The ECU 30 performs steering gear ratio variable control and transmits the gear ratio variable control signal to the gear ratio adjustment actuator 21.

An electrically assisted power steering device will be described. The ECU 30 sets target steering assist torque according to a vehicle speed and a steering wheel angle with reference to a steering assist torque map prepared in advance. The ECU 30 generates the steering control signal for generating the target steering assist torque and transmits the steering control signal to the steering actuator 20.

The steering gear ratio variable control will be described. First, for every predetermined time, the ECU 30 calculates an induction target tire angle for causing the vehicle to travel along the target locus. As the method of calculating the induction target tire angle, any method may be used. For example, a method may be used in which an induction target tire angle is obtained from a target locus used for lane keeping or automatic driving. Specifically, the center line (target locus) of the pair of white lines detected by the white line detection sensor 13 is acquired, and the offset of the own vehicle with respect to the center of the lane or the yaw angle of the own vehicle (that is, the relative position of the own vehicle with respect to the target locus) calculated by the white line detection sensor 13 are acquired. Then, general PID control or the like is used to calculate an induction target tire angle for causing the own vehicle to travel along the target locus on the basis of the relative position of the own vehicle with respect to the target locus.

Each time the induction target tire angle is calculated, the ECU 30 creates a steering wheel angle-tire angle correspondence map corresponding to a gear ratio map in the steering gear ratio variable function. A specific method of creating a steering wheel angle-tire angle correspondence map will be described with reference to FIG. 2. In the map, the horizontal axis represents a steering wheel angle, the vertical axis represents a tire angle, the plus side represents a rightward rotation direction, and the minus side represents a leftward rotation direction.

First, in a range of a rightward maximum steering wheel angle to a leftward maximum steering wheel angle, a basic map BM in which a tire angle corresponds to a steering wheel angle at a gradient of 45° is created (or the basic map BM is prepared). If the induction target tire angle is calculated, an intersection P of the basic map BM and the induction target tire angle is obtained. Then, an angle θ at which the steering wheel angle-tire angle correspondence map passes through the intersection P is determined in the range of 0°<θ<45° such that the tire angle is unlikely to change with respect to the change in the steering wheel angle near the induction target tire angle. For example, the angle θ at which the steering wheel angle-tire angle correspondence map passes through the intersection P is determined by Expression (1).

[Expression 1]

$$\theta = \min((\text{road width}(m) - \text{vehicle width}(m)) \times k, 45) \quad (1)$$

Here, k is an adjusted coefficient, for example, 10 (no guidance is required with a road margin of 4.5 m).

If the angle θ becomes 0°, this means a dead zone where the tire angle does not change with respect to the steering wheel angle. If the angle θ becomes 45°, the tire angle changes with respect to the steering wheel angle in the same manner as the basic map BM. If the angle θ is larger than 45°, the tire angle changes with respect to the steering wheel angle more quickly than the basic map BM. If the angle θ is smaller than 0°, the tire angle changes in the opposite direction to the rotation direction of the steering wheel angle. Thus, the angle θ is set in the range of 0°<θ<45°, and near the induction target tire angle, the tire angle is set so as to change with respect to the steering wheel angle more dully than the basic map BM.

The steering wheel angle-tire angle correspondence map GM is created by a general curve formula (for example, spline curve) under the conditions that the steering wheel angle-tire angle correspondence map GM passes through the intersection P at the angle θ and crosses the basic map BM at a rightward maximum steering wheel angle and a leftward maximum steering wheel angle.

In the steering wheel angle-tire angle correspondence map GM, near the induction target tire angle, the tire angle is unlikely to change with respect to the change in the steering wheel angle, and the gear ratio (reduction gear ratio) in the steering mechanism is larger than the gear ratio of the basic map BM. In particular, as the angle θ at which the steering wheel angle-tire angle correspondence map GM passes through the intersection P is close to 0°, the tire angle is unlikely to change with respect to the change in the steering wheel angle, and the gear ratio in the steering mechanism increases. Thus, near the induction target tire angle, the tire angle near the induction target tire angle can be easily maintained, and traveling on the target locus can be easily performed (there is a strong tendency of guiding to the target locus).

Meanwhile, as the tire angle moves away from near the induction target tire angle, the tire angle is likely to change with respect to the change in the steering wheel angle, and the gear ratio in the steering mechanism decreases. In particular, as it approaches the rightward maximum steering wheel angle or the leftward maximum steering wheel angle, the tire angle is likely to change quickly with respect to the change in the steering wheel angle, and the gear ratio in the steering mechanism becomes smaller than the gear ratio of the basic map BM. Thus, in the regions other than near the induction target tire angle, the tire angle changes in accordance with the steering wheel angle, and traveling can be easily performed by a manual operation.

In the steering wheel angle-tire angle correspondence map GM, as the tire angle approaches the induction target tire angle, the gear ratio increases, and if the tire angle moves away from the induction target tire angle, the gear ratio approaches the gear ratio of the basic map BM and becomes the gear ratio of the basic map BM with time. Further, as the tire angle approaches the rightward maximum tire angle or the leftward maximum tire angle, the gear ratio decreases. As described above, the steering wheel angle-tire angle correspondence map GM becomes a map in which the gear ratio nonlinearly changes.

Thus, in the steering wheel angle-tire angle correspondence map GM, the range of a steering wheel angle corresponding to a tire angle near the induction target tire angle (corresponding to a predetermined range described in the appended claims) is set to be wider than the range of a steering wheel angle corresponding to a tire angle in a region other than near the induction target tire angle (corresponding to outside of the predetermined range described in the appended claims).

If the steering wheel angle-tire angle correspondence map is created, the ECU 30 acquires an actual steering wheel angle from the steering angle sensor 10. Then, the ECU 30 extracts a tire angle according to the actual steering wheel angle from the steering wheel angle-tire angle correspondence map GM, and sets the extracted tire angle as a target tire angle. In addition, the ECU 30 acquires an actual tire angle from the tire angle sensor 11. Finally, the ECU 30 performs general PID control to generate a gear ratio variable control signal for setting the actual tire angle as the target tire angle on the basis of a difference between the target tire angle and the actual tire angle, and transmits the gear ratio variable control signal to the gear ratio adjustment actuator 21.

Figure 3:
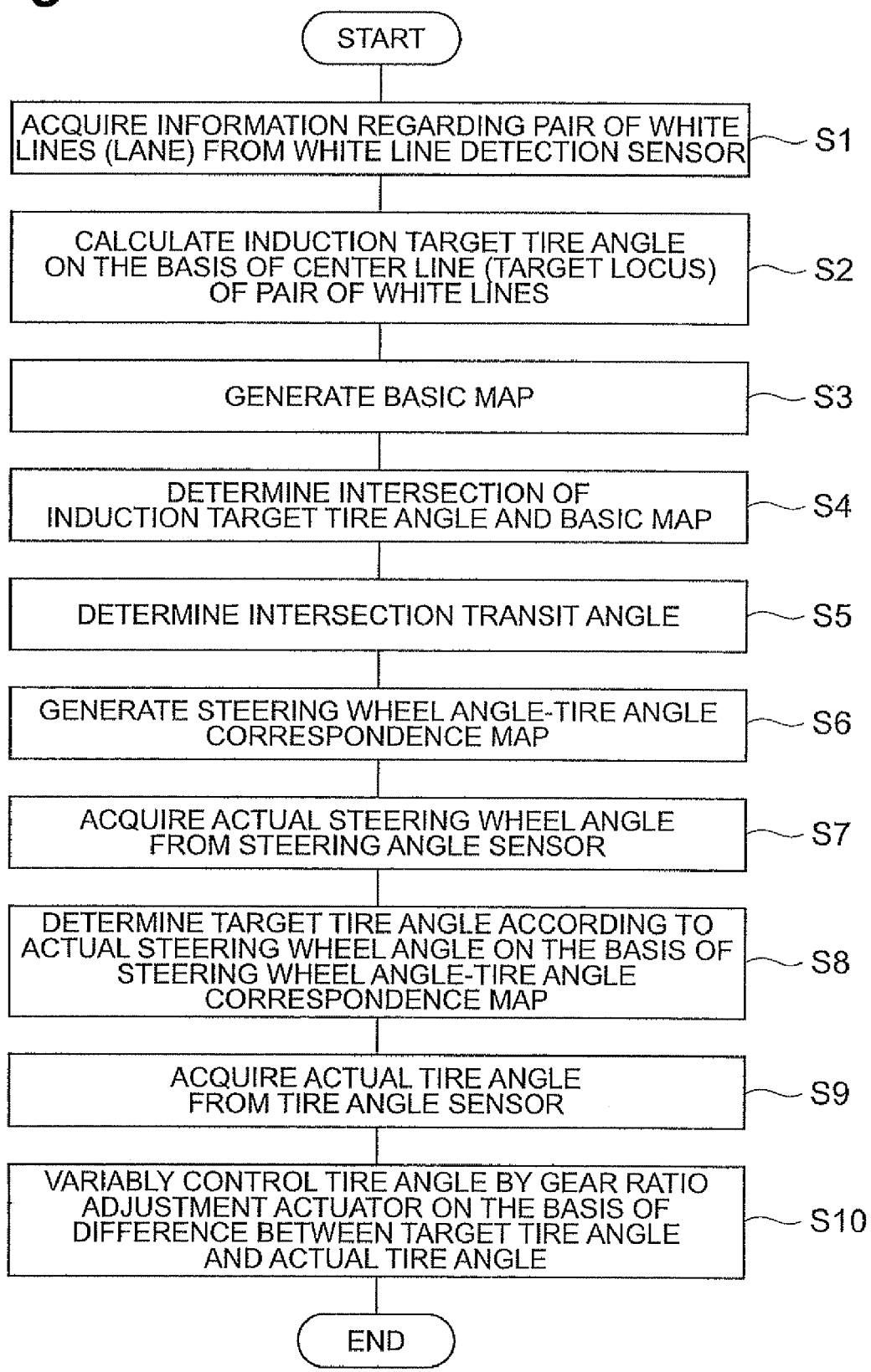
FIG. 3 is a flowchart showing a flow of a steering gear ratio adjustment control in an ECU of FIG. 1.

The operation of steering gear ratio variable control in the steering control device 1 will be described with reference to FIGS. 1 and 2. In particular, processing in the ECU 30 will be described with reference to a flowchart of FIG. 3. FIG. 3 is a flowchart showing a flow of steering gear ratio variable control in the ECU of FIG. 1.

The steering angle sensor 10 detects a steering angle (actual steering wheel angle) by a manual operation of the driver, and transmits a steering angle signal to the ECU 30. The tire angle sensor 11 detects a tire angle of turned wheels, and transmits a tire angle signal to the ECU 30. The wheel speed sensor 12 of each wheel detects a wheel rotation pulse number, and transmits a wheel speed signal to the ECU 30. The white line detection sensor 13 captures an image of the front side of the own vehicle, detects a pair of white lines and calculates various kinds of information representing a relationship between the white lines and the own vehicle on the basis of the captured image, and transmits a white line detection signal to the ECU 30.

The ECU 30 acquires information regarding a pair of white lines from the white line detection sensor 13 for every predetermined time (S1). Next, the ECU 30 sets the center line of a pair of white lines as a target locus, and calculates an induction target tire angle on the basis of the relative position of the own vehicle with respect to the target locus (S2).

Each time the induction target tire angle is calculated, the ECU 30 generates a basic map BM in which the tire angle corresponds to the steering wheel angle at a gradient of 45° (S3). Next, the ECU 30 determines an intersection P of the induction target tire angle and the basic map BM (S4). In addition, the ECU 30 determines an angle θ (0°<θ<45°) at the intersection P (S5). Next, the ECU 30 generates a steering wheel angle-tire angle correspondence map GM which passes through the intersection P at the angle θ and crosses the basic map BM at the rightward maximum steering wheel angle and the leftward maximum steering wheel angle (S6).

The ECU 30 acquires an actual steering wheel angle from the steering angle sensor 10 (S7). Next, the ECU 7 determines a target tire angle according to the actual steering wheel angle on the basis of the steering wheel angle-tire angle correspondence map GM (S8). In addition, the ECU 30 acquires an actual tire angle from the tire angle sensor 11 (S9). Next, the ECU 30 generates a gear ratio variable control signal on the basis of a difference between the target tire angle and the actual tire angle, and transmits the gear ratio variable control signal to the gear ratio adjustment actuator 21 (S10). When receiving the gear ratio variable control signal, the gear ratio adjustment actuator 21 changes the tire angle in accordance with the gear ratio variable control signal. Thus, the tire angle of the own vehicle is controlled so as to become the target tire angle corresponding to the actual steering wheel angle obtained from the steering wheel angle-tire angle correspondence map GM.

When the driver manipulates the steering wheel to travel along the center of the lane, the tire angle becomes near the induction target tire angle in accordance with the steering wheel manipulation. At this time, the reduction gear ratio in the steering mechanism is larger than the normal state, so even when the driver moves the steering somewhat, there is almost no change in the tire angle. For this reason, the tire angle near the induction target tire angle can be easily maintained. In addition, the change in the tire angle is small with respect to the change in the steering wheel angle, so the driver can easily perform fine adjustment of the tire angle. Therefore, traveling along the center of the lane can be easily performed regardless of manual torque.

When the driver manipulates the steering wheel to travel slightly shifted from the center of the lane (for example, to travel out of a track or to slightly avoid an adjacent heavy vehicle), the tire angle becomes a tire angle slightly shifted from near the induction target tire angle in accordance with the steering wheel manipulation. At this time, the reduction gear ratio in the steering mechanism is substantially equal to or smaller than that of the basic map BM, and there is no disturbance due to steering assist torque, so the driver can easily manipulate the steering wheel in accordance with his/her intention, and the tire angle changes in accordance with the steering wheel manipulation. Therefore, traveling along a locus intended by the driver can be easily performed.

When the driver manipulates the steering wheel to quickly change the orientation of the vehicle (for example, to avoid an obstacle ahead), the tire angle approaches the rightward maximum tire angle or the leftward maximum tire angle in accordance with the steering wheel manipulation. At this time, the reduction gear ratio in the steering mechanism decreases, so the driver can quickly manipulate the steering wheel as intended, and the tire angle quickly changes in accordance with the steering wheel manipulation. Therefore, the orientation of the vehicle can be quickly changed.

With the steering control device 1, the gear ratio in the steering mechanism is adjusted in accordance with the induction target tire angle, and the gear ratio near the induction target tire angle increases. Thus, during manual driving, even when there is no steering assist torque, the guidance to the target locus can be achieved, and traveling near the target locus can be easily performed. In particular, even a driver who is poor at driving can travel along the target locus, and fine adjustment of a traveling line near the target locus can be easily performed.

With the steering control device 1, the gear ratio other than near the induction target tire angle decreases, such that traveling desired by the driver can be easily performed, and traveling away from the target locus can be performed. In particular, the gear ratio near the maximum steering wheel angle (maximum tire angle) is smaller than the normal state, so rapid steering in accordance with the driver's intention can be performed in an emergency, such as obstacle avoidance.

In the steering control device 1, the steering wheel angle-tire angle correspondence map is created in accordance with the induction target tire angle. Therefore, the target tire angle according to the steering wheel angle by the driver can be simply extracted from the steering wheel angle-tire angle correspondence map, and the gear ratio in the steering mechanism can be adjusted in accordance with the steering wheel angle-tire angle correspondence map.

The steering control device 1 uses the steering gear ratio adjustment function, so the gear ratio in the steering mechanism can be simply adjusted, and steering control based on the steering wheel angle-tire angle correspondence map can be easily performed.

Although the embodiment of the invention has been described, the invention is not limited to the above-described embodiment and may be carried out in various forms.

For example, although in this embodiment, the steering control device is applied to a steering control device having a steering gear ratio adjustment function and an electrically assisted power steering function, a steering gear ratio adjustment device and an electrically assisted power steering device may be separately provided, or may be applied to other devices, such as a lane keeping device or an automatic driving device. Upon lane keeping or automatic driving, the steering control device may be applied to one which provides steering assist torque for guiding to the target locus.

Although in this embodiment, the steering characteristic (reduction gear ratio) is controlled by using the steering gear ratio adjustment function, the steering characteristic may be controlled by other configuration.

Although in this embodiment, a configuration of a single ECU is provided, an ECU for electrically assisted power steering control or steering gear ratio variable control may be separately provided.

Although in this embodiment, control is performed such that the steering wheel angle-tire angle correspondence map is created, and the gear ratio (tire angle) changes using the steering wheel angle-tire angle correspondence map, control may be performed such that the gear ratio (tire angle) changes without creating such a map.

The invention claimed is:

1. A steering control device for a vehicle comprising:
a steering characteristic setting unit setting a first range of a steering manipulation angle corresponding to a predetermined tire angle range, and setting a second range of a steering manipulation angle corresponding a tire angle range excluding the predetermined tire angle range, the steering characteristic setting unit setting the first range to be wider than the second range; and
a basic map defining a relationship between the steering manipulation angle and a tire angle with respect to the steering manipulation angle,
wherein the predetermined tire angle range is determined by a target locus upon vehicle traveling, and
the steering characteristic setting unit sets the first range to be wider than the basic map and generates a steering characteristic map so as to conform to the basic map at a maximum tire angle with respect to a maximum steering manipulation angle.

2. The steering control device according to claim 1, further comprising:
a steering reduction gear ratio adjustment mechanism changing a reduction gear ratio in a steering mechanism,
wherein the steering characteristic setting unit sets the reduction gear ratio by the steering gear ratio adjustment mechanism to be larger as the tire angle approaches the tire angle for attaining the target locus.

3. A vehicle comprising:
a steering control device,
wherein the steering control device includes:
a steering characteristic setting unit setting a first range of a steering manipulation angle corresponding to a predetermined tire angle range, and setting a second range of a steering manipulation angle corresponding a tire angle range excluding the predetermined tire angle range, the steering characteristic setting unit setting the first range to be wider than the second range; and
a basic map defining a relationship between the steering manipulation angle and a tire angle with respect to the steering manipulation angle,
the predetermined tire angle range is determined by a target locus upon vehicle traveling,
the steering characteristic setting unit sets the first range to be wider than the basic map and generates a steering characteristic map so as to conform to the basic map at a maximum tire angle with respect to a maximum steering manipulation angle, and
steering control is performed by using the steering characteristic map, such that, under the condition of the predetermined tire angle range, the tire angle is unlikely to change with respect to a manual operation of a driver more than under the condition of the tire angle excluding the predetermined tire angle range.

4. The vehicle according to claim 3,
wherein the predetermined range changes during vehicle traveling.

5. A vehicle comprising:
a steering control device,
wherein the steering control device includes:
a steering characteristic setting unit setting a first range of a steering manipulation angle corresponding to a predetermined tire angle range, and setting a second range of a steering manipulation angle corresponding a tire angle range excluding the predetermined tire angle range, the steering characteristic setting unit setting the first range to be wider than the second range; and
a basic map defining a relationship between the steering manipulation angle and a tire angle with respect to the steering manipulation angle,
the predetermined tire angle range is determined by a target locus upon vehicle traveling,
the steering characteristic setting unit sets the first range to be wider than the basic map and generates a steering characteristic map so as to conform to the basic map at a maximum tire angle with respect to a maximum steering manipulation angle, and
steering control is performed by using the steering characteristic map, such that the tire angle is unlikely to change with respect to a manual operation of a driver the tire angle is near a target value.

6. The vehicle according to claim 5,
wherein the predetermined range changes during vehicle traveling.

* * * * *